United States Patent
Bruntz

[11] Patent Number: 5,896,968
[45] Date of Patent: Apr. 27, 1999

[54] TORQUE LIMITING MECHANISM

[75] Inventor: Rodney D. Bruntz, Valley Center, Kans.

[73] Assignee: The Carlson Company, Inc., Wichita, Kans.

[21] Appl. No.: 08/844,899

[22] Filed: Apr. 22, 1997

[51] Int. Cl.⁶ .................................................. F16D 43/206
[52] U.S. Cl. .......................................... 192/56.57; 464/36
[58] Field of Search .............................. 192/56.33, 56.54, 192/150, 56.43, 56.57, 56.62; 464/36

[56] References Cited

U.S. PATENT DOCUMENTS

| | | | |
|---|---|---|---|
| 3,599,067 | 8/1971 | Wallis | 192/56.57 X |
| 3,774,738 | 11/1973 | Steinhagen | 192/56.57 |
| 3,893,553 | 7/1975 | Hansen | 192/56.57 |
| 4,373,923 | 2/1983 | Kilwin | 192/56.57 X |
| 4,770,281 | 9/1988 | Hanks | 192/53.33 |
| 4,838,400 | 6/1989 | Fortune | 192/56.57 |
| 5,005,684 | 4/1991 | Fujii | 192/56.57 |

*Primary Examiner*—Charles A. Marmor
*Assistant Examiner*—Saúl J. Rodríguez
*Attorney, Agent, or Firm*—Shook, Hardy, & Bacon LLP

[57] ABSTRACT

A mechanism for limiting torque transmission between rotating bodies to prevent equipment damage due to torque overload. A shaft has a drive collar which is adjacent to a ring carried by a sleeve supported on the shaft by a bearing. The ring has axial passages that carry balls. A spring loaded thrust bearing normally maintains the balls seated in pockets on the collar so that torque is normally transmitted between the shaft and sleeve. When the applied torque is sufficient to overcome the spring force, the balls unseat from the pockets and disengage the transmission of torque. The balls and pockets are circumferentially arranged in a special pattern assuring that reengagement occurs only after a complete rotation and also assuring that the balls are able to support the spring load when they are unseated.

11 Claims, 3 Drawing Sheets

TORQUE LIMITING MECHANISM

FIELD OF THE INVENTION

This invention relates generally to the transmission of torque between rotating parts and deals more particularly with a mechanism for uncoupling rotating machinery elements to protect them against damage when torque overloads are encountered.

BACKGROUND OF THE INVENTION

It is common for torque limiting devices to be provided on machinery which is subject to mishaps that can damage the equipment. By way of example, packing machinery which packages bottles or other containers in cartons typically includes folding arms for folding the carton flaps. It is not unusual for a container to be mispositioned in the carton, and this can prevent the folding arms from completing the folding operation. In order to prevent the arms from being forced and possibly damaged in this situation, a torque limiter can be provided in the drive system for the arms. The torque limiter is normally set to slip or otherwise release the components of the drive system at a torque level above the normal torque level that is applied when the equipment is operating properly. Thus, the torque transmission is stopped when undue torque is applied, and damaged to the arms and other equipment is avoided.

More complicated devices known as single position torque limiters are often required. If the equipment includes a conveyor or other machinery which must be synchronized with the operation of the folding arms, it is necessary for the torque limiter to reengage the drive system a single rotation after disengagement in order to preserve the proper timing relationship. Random reengagement or reengagement at a time other than when a complete cycle has occurred would throw off the synchronization required for proper operation of the equipment. Devices which reengage properly after a cycle has been skipped are referred to as single position torque limiters.

While there have been single position torque limiting devices available in the past, they have not been altogether satisfactory. The mechanisms that are required are typically somewhat complicated and thus costly and subject to expensive maintenance and repair requirements. In addition, torque limiting devices tend to be large and bulky. This not only leads to space requirements that create problems in many applications, but it also results in high costs due to the need for larger parts.

SUMMARY OF THE INVENTION

The present invention is directed to an improved single position torque limiter which is characterized by a more compact configuration and by a less complex and less costly construction than the devices that have been available in the past.

In accordance with the invention, a sleeve is mounted around a rotary shaft by a bearing which allows the sleeve to rotate relative to the shaft. A collar on the periphery of the shaft is adjacent to a ring projecting inwardly from the sleeve. The ring has spaced apart axial passages which carry balls that normally transmit torque between the collar and ring to couple the shaft and the sleeve for rotation together. A spring loaded thrust bearing normally maintains the balls seated in pockets formed in the collar so that the shaft normally drives the sleeve. However, if the equipment driven by the sleeve jams or if there is a torque overload for some other reason, the balls slip out of the pockets against the spring force and then ride on the face of the collar to stop the torque transmission.

The circumferential arrangement of the balls and pockets provides the mechanism with single position capability which assures that reengagement occurs at only a single position of the collar relative to the ring. At the same time, the ball and pocket pattern maintains at least three balls on the face of the collar after the balls have unseated from the pockets. These balls are spaced approximately 120° apart so that the spring load is readily supported in a manner to avoid wobbling or other instability.

The compact arrangement of the mechanism is due in large part to the location of all of the balls and pockets at the same radial distance from the axis of rotation. A multiple radius configuration is somewhat simpler to achieve mechanically, but it actually complicates things and leads to increased size because of the added radial space that is required. Compactness also results from the arrangement of the working parts of the mechanism in the area between the shaft and the sleeve rather than at a location farther out on larger diameter parts. The way in which the parts are arranged also results in application of thrust loads and axial movement on components that rotate with the shaft.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
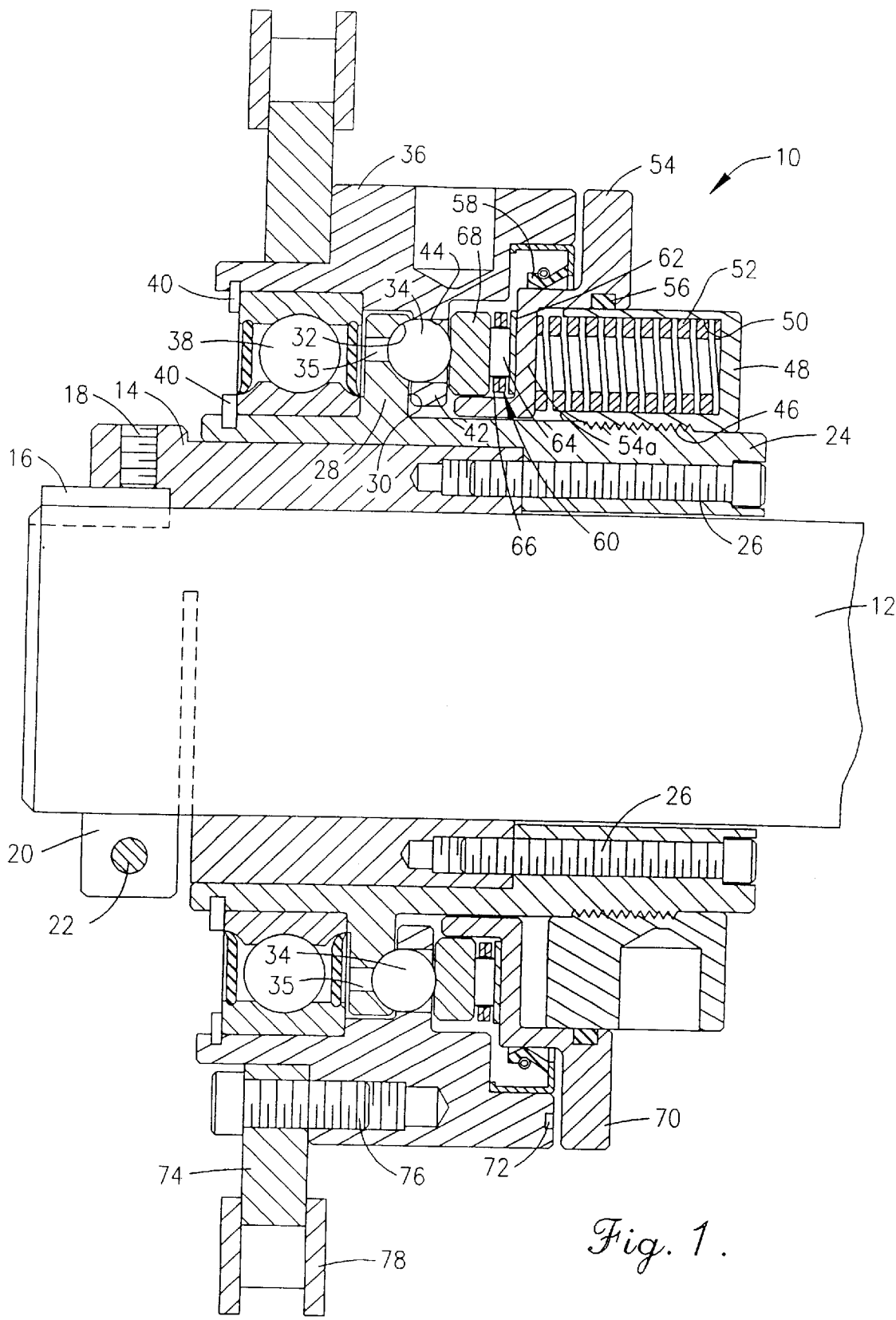
FIG. 1 is a fragmentary sectional view taken through a torque limiting mechanism constructed according to a preferred embodiment of the present invention, with the parts of the mechanism in the torque transmitting condition in which the balls are seated in the pockets of the drive collar.
Figure 2:
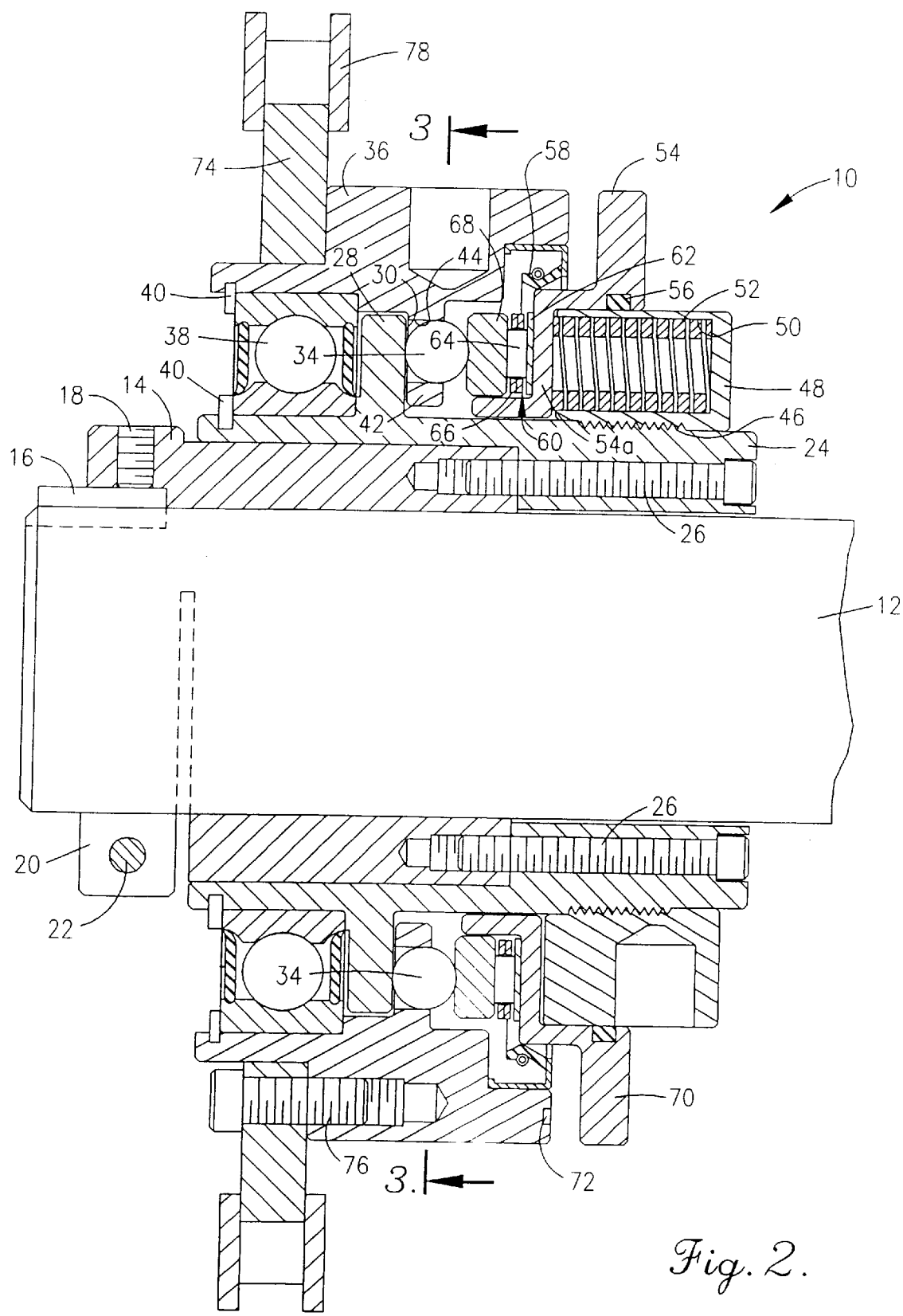
FIG. 2 is a fragmentary sectional view similar to FIG. 1, but showing the disengaged position of the mechanism in which the balls are unseated from the pockets.

Referring now to the drawings in more detail, a torque limiting mechanism constructed in accordance with the present invention is generally identified by numeral 10 in FIGS. 1 and 2. The mechanism 10 may be used with a rotary shaft 12 which may be rotated about its central axis by a drive motor or other drive system (not shown) Secured to the shaft is an adapter bushing 14 which extends around the shaft and may be connected to it by a key 16. A set screw 18 may be threaded into the adapter bushing 14 and tightened against the key 16. The bushing 14 includes a split collar 20 which may be tightened around the shaft 12 and secured by a fastener such as a bolt 22.

A generally cylindrical hub 24 is extended around the shaft 12 and a portion of the bushing 14 and is secured to the bushing by a plurality of screws 26. Projecting outwardly from the portion of the hub 24 that surrounds bushing 14 is an annular drive ring or collar 28. The collar 28 has a substantially flat, annular surface 30 in which a plurality of pockets 32 (FIG. 1) are formed. The pockets 32 are all on the same radius or equidistance from the axis of the shaft 12. The pockets 32 present partially spherical surfaces on which a plurality of balls 34 normally seat. The pockets 32 are vented by passages 35.

A back plate which takes the form of a sleeve 36 extends generally around the shaft 12 and also around the bushing 14 and hub 24. The sleeve 36 is supported for rotation relative to the shaft 12 and coaxially with the shaft by a ball bearing 38 which is interposed between the sleeve and shaft. The ball bearing 38 is held in place by retainer rings 40 which are snapped into grooves formed in the hub 24 and sleeve 36.

Projecting inwardly from the inside surface of the sleeve 36 is an annular ring 42. The ring 42 is located adjacent to the face 30 of collar 28. The balls 34 are received in axial passages 44 which are formed through the ring 42 and which extend parallel to the axis of the shaft 12. The balls 34 are spherical and fit closely in the passages 44. The balls are restrained by the size of the passages 44 from radial movement, although they are able to move axially in the passages 44 in a direction parallel to the axis of shaft 12.

The outer surface of the hub 24 is externally threaded as indicated at 46. A nut 48 is threaded onto the threads 46 and may be tightened or loosened on the threads to the position desired for proper adjustment of the mechanism. The nut 48 has a plurality of cylindrical cavities 50 which are spaced uniformly around the circumference of the nut. Each cavity 50 receives a compression spring 52 which seats in the cavity at one end and acts at its opposite end against a bent spring plate 54. The spring plate 54 is fitted loosely around the hub 24. The internal components of the torque limiting mechanism 10 are shielded from contamination by an O-ring 56 which seals the spring plate 54 to the nut 48 and by a dynamic seal 58 which seals the sleeve 36 to the spring plate 54.

The springs 52 act against an annular plate portion 54*a* of the spring plate 54 and urge the spring plate to the left as viewed in FIGS. 1 and 2. A needle thrust bearing 60 is interposed between the plate portion 54*a* of the spring plate and the balls 32. The thrust bearing 60 has a back plate 62 which bears against the plate portion 54*a*. A plurality of needle elements 64 engage the back plate 62 and are retained by a cage retainer 66. The needles 64 contact a thicker thrust ring 68 on the side opposite the back plate 62. The thrust ring 68 engages the balls 34. The thrust which the springs 52 apply to the spring plate 54 is transmitted to the balls 34 by the needle thrust bearing 60 to continuously urge each of the balls 34 to the left as viewed in FIGS. 1 and 2. Thus, the balls are normally seated in the pockets 32 which have axial and circumferential seating surfaces.

The spring plate 54 has an outer flange 70 which operates near a sensor 72 which may be a proximity sensor mounted to one end of the sleeve 36. When the balls 34 are seated in the pockets 32, the flange 70 is in the position shown in FIG. 1 where it is closely adjacent to the sensor 72. When the balls are unseated from the pockets and are engaged against the face 30 of collar 28 in the position shown in FIG. 2, the flange 70 is spaced more distantly from the sensor 72, and the sensor provides a signal indicative of this more remote location of the flange 70. A signal can be used to shut off the motor which drives the shaft 12.

The sleeve 36 may be used to drive various types of equipment. For example, a sprocket 74 may be secured to rotate with the sleeve by a plurality of screws 76. The sprocket 74 may be used to drive a chain 78 which can operate equipment such as folding arms or the like (not shown).

Figure 3:
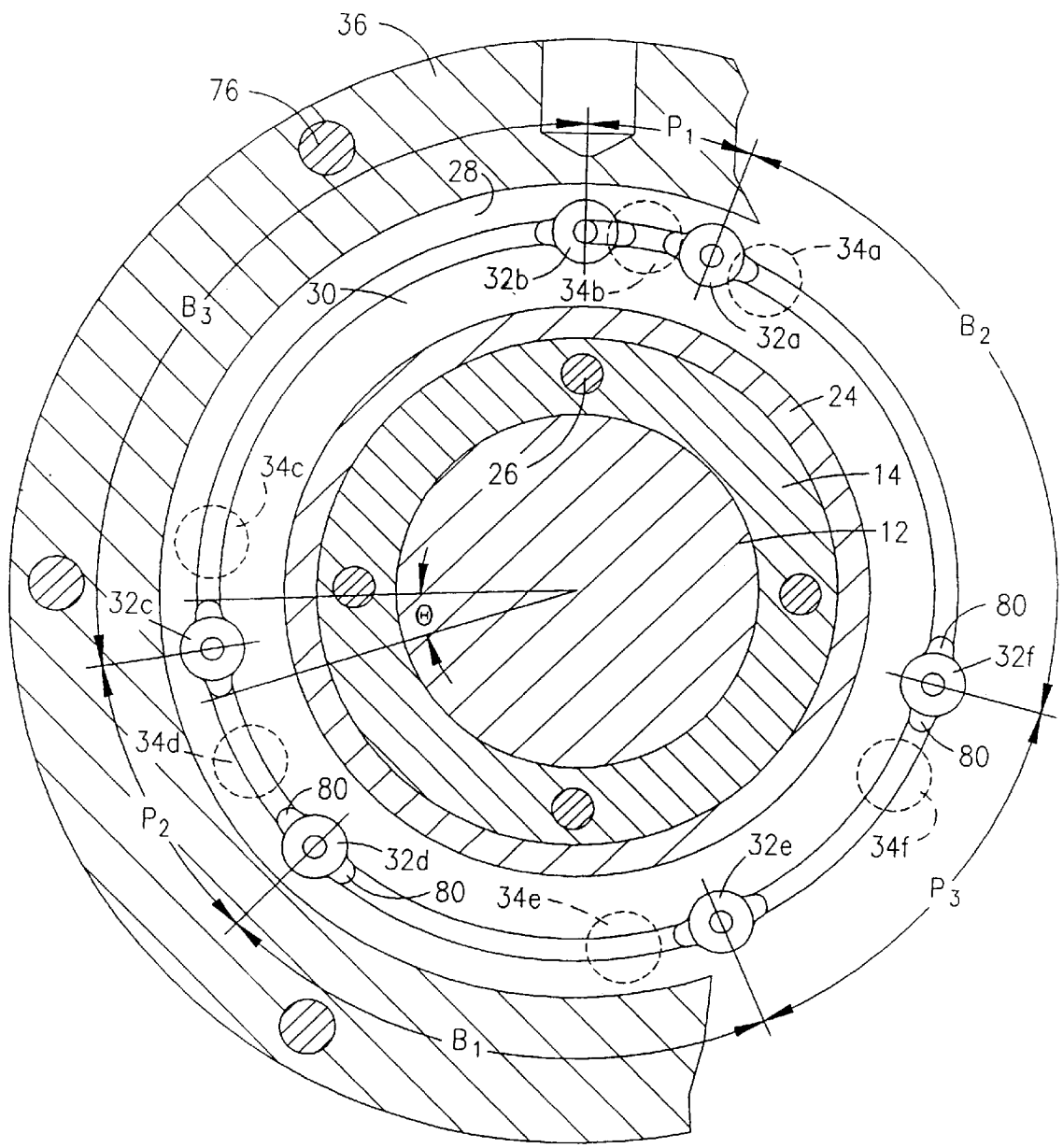
FIG. 3 is a fragmentary sectional view taken generally along line 3—3 of FIG. 2 in the direction of the arrows.

FIG. 3 depicts the circumferential arrangement of the pockets 32 and the balls 34 (which are held at a fixed circumferential position by the passages 44 which closely receive them). The pockets 32 are arranged in three sets of pairs. One pair includes the pockets 32*a* and 32*b* which are separated by an arcuate distance subtended by the angle identified as P1 in FIG. 3. The angle Pi is defined by radial lines extending from the axis of shaft 12 through the centers of the pockets 32*a* and 32*b*.

Similarly, another pair of pockets include the pockets 32*c* and 32*d* which are separated by angle P2 which is larger than angle P1. The final set of pockets includes the pockets 32*e* and 32*f* which are separated by the angle P3. It is noted that angle P3 is larger than angle P2.

Thus, the spacing between the pockets in each pair of pockets beginning with the pockets 32*a* and 32*b* progressively increases around the drive collar 28 in a counterclockwise direction as viewed in FIG. 3.

Each of the pockets 32 has a pair of transition ramps 80 which are diametrically opposed and which are located at the same radial distance as the pocket centers. The ramps 80 provide smooth transition areas for the balls to move out of the pockets 32 onto the face 30 of the drive collar and back into the pockets from the drive collar face.

For each of the pockets 32, the ends of the transition ramps 80 are separated by an angle identified as angle $\theta$ in FIG. 3. Preferably, the angle P1 is greater than the angle $\theta$. The angle P2 preferably exceeds the angle P1 by at least the angle $\theta$, and angle P3 preferably exceeds angle P2 by at least the angle $\theta$.

The pockets in different pairs of pockets which are closest together are the pockets 32*d* and 32*e* which are separated by the angle B1 identified in FIG. 3. The next closest pockets in different pairs are the pockets 32*a* and 32*f* which are separated by the angle B2. The final pair of adjacent pockets in different pairs are the pockets 32*b* and 32*c* which are separated by the angle B3. The angle B1 is preferably greater than the angle P3 by at least the angle $\theta$. Angle B2 is preferably larger than angle B1 by at least the angle $\theta$. Finally, angle B3 is greater than angle B2 by at least the angle $\theta$ in the preferred embodiment of the present invention.

The balls 34 are located in pairs having a pattern that matches the pattern of the pockets 32. Thus, the balls include one pair 34*a* and 34*b* which are centered at locations that are spaced apart by the angle P1. Another pair of balls 34*c* and 34*d* are centered at locations that are spaced apart by the angle P2. The final pair of balls are the balls 34*e* and 34*f* which are centered at locations spaced apart by the angle P3. The balls are all centered at the same radial distance from the center of shaft 12 as the pockets and are spaced identically to the pockets.

The balls 34 are located such that all of them can enter the respective pockets 32 when the ring 42 is positioned relative to ring 28 where all of the balls 34 are simultaneously aligned with the corresponding pockets 32. The arrangement of the balls and pockets is such that there is only one rotative position of ring 42 relative to collar 28 at which the balls align with the pockets.

Preferably, the midpoint between each pair of pockets and each pair of balls is angularly spaced at approximately 120° from the midpoints of the two other pairs of balls and pockets. However, it should be noted that other arrangements of the balls and pockets are possible.

In operation, the shaft 12 may be driven by a motor or the like and normally transmits torque for driving of the sleeve 36 which may operate equipment driven by the chain 78. Alternatively, the chain 78 and sprocket 74 or some other drive system may be used to rotate the sleeve 36, and the sleeve 36 would then normally drive the shaft 12. Thus, the mechanism 10 is reversible in the sense that it can drive the machinery in either direction. When collar 28 is turning, each pair of pockets 32 includes a leading pocket and a trailing pocket. Similarly, when ring 42 is rotating, each pair of balls 34 includes a leading ball and a trailing ball.

Assuming for purposes of illustration that the sleeve 36 is driven, the springs 52 act through the spring plate 54 and the thrust bearing 60 to normally maintain the balls 34 seated in the corresponding pockets 32. The rotation of the ring 42 carries the balls with it, and the balls are seated in the pockets 32 to transmit the torque and rotation to the collar 28. Rotation of the collar 28 is in turn transmitted to the shaft 12 to rotate it about its axis.

If downstream equipment operated by the shaft 12 should jam or if undue resistance to shaft rotation is encountered for some other reason, a torque overload situation can arise. Then, the resistance to rotation is sufficient to cause the balls 34 to unseat from the pockets 32 and retract into the passages 44 as the balls move along the transition ramps 80 toward the face 30 of the collar 28. This occurs when the torque overload is sufficient to overcome the force applied by the springs 52. After the balls have moved out of the pockets onto face 30, only minimal residual torque is transmitted from the rotating ring 42 to the collar 28, and the shaft 12 is then essentially uncoupled from the sleeve 36.

The provision of the needle thrust bearing 60 minimizes the residual torque that is transmitted after the balls 34 have rolled out of the pockets 32. When the balls have rolled out of the pockets, flange 70 is in the position shown in FIG. 2 where it is displaced from its normal position in close proximity to the sensor 72. This displacement of flange 70 is sensed by the sensor 72, and this sensed condition can be used by a transducer or some other device to shut down the drive system which is rotating the sleeve 36.

While the ring 42 is rotating around to a position in which the balls 34 are again aligned with pockets 32, several of the balls 34 may move into pockets 32. However, the arrangement of the balls and pockets is such that one of the balls in each pair will be on the face 30 at all times during the roll out period. Consequently, there is always at least one ball located near each 120° interval that is riding along the face 30 in order to support the spring load at relatively uniform locations around the ring 42 and in a manner so that there is no wobbling or other unstable motion of the components. A single ball dropping into a pocket is not enough to transmit significant torque because the balls riding on face 30 prevent the spring force from holding the ball in the pocket.

Because the angle P1 is greater than the angle θ, the two balls 34a and 34b in the closest pair of balls are not partially in a pocket at the same time. Because the angle P2 is greater than the angle P1 plus θ and because the angle P3 is greater than the angle P2 plus θ, no two balls in any pair are partially in different pockets at the same time. Because the angel B1 is greater than the angle P3 plus θ, the leading ball 34d in its pair and the trailing ball 34e in the next pair cannot be partially in the respective pockets 32e and 32f (the most distantly spaced pockets in any pair of pockets) at the same time. Because angle B2 is greater than angle B1 plus θ and because angle B3 is greater than B2 plus θ, the leading and trailing balls of adjacent pairs are not partially in the leading and trailing pockets of different pairs of pockets at the same time. The ball and pocket arrangement and the relative angular positions of the balls and pockets thus assures that one ball in each pair will be riding on the face 30 at all times during any roll out period.

When ring 42 has made a complete revolution relative to collar 28 after the overload torque condition unseated the balls from the pockets, the balls will all again be aligned with the proper pockets, and the balls then move into the pockets under the influence of the springs 52 acting through the thrust bearing 60. At this time, torque will again be transmitted from the sleeve 36 to the shaft 12. Also, the proximity sensor 72 senses the close proximity of flange 70 and allows the drive equipment to be activated. The adjustment nut 48 can be backed off on the threads 46 to decrease the compression of the springs 52 and thus decrease the spring force tending to retain the balls in the pockets. Conversely, the nut 48 can be tightened to increase the spring force as desired.

It is again pointed out that the torque limiting mechanism 10 is reversible in that shaft 12 can be driven and the mechanism 10 can be used to transmit torque from the shaft 12 to the sleeve 36. Under these conditions, a torque overload condition causes the balls 34 to unseat from the pockets 32 in substantially the same manner that has been described. In either case, a single revolution or cycle of the driven body (shaft 12 or sleeve 36) is required before the bodies are coupled together again so that torque is transmitted between them. Consequently, the mechanism 10 is a single position torque limiter in that one relative rotation between the collar 28 and ring 42 results in reengagement of the torque transmission to preserve synchronization with other parts of the machinery such as conveyors and the like.

The torque limiting mechanism 10 is characterized by a compact configuration and by an economical manufacturing cost in part because the pocketed drive collar 28 rotates with the shaft 12. This allows all of the thrust loads and axial movement to be applied to components which rotate with the shaft. All of the working parts of the mechanism 10 are located on the inner diameter of the sleeve 36, thus allowing the unit to be constructed more compactly and less expensively than would be the case with mechanical working parts located on the exterior of the sleeve or on other large diameter parts.

The size of the unit and the manufacturing costs are minimized due to the location of all of the balls and all of the pockets on a single radius. It is possible to construct a device with the balls located at different radial distances. Because balls located at one radial distance will not drop into pockets located at a different radial distance, this type of construction provides a somewhat simpler single position torque limiter. However, it also requires additional radial space which increases the size and cost of the parts.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

I claim:

1. Apparatus for limiting torque transmission, said apparatus comprising:

first and second bodies rotatable about an axis relative to one another;

a first ring rotating with said first body, said first ring having a plurality of cylindrical passages extending substantially parallel to said axis and being uniform in diameter from end to end;

a plurality of spherical ball elements carried in said passages and being movable therein in an axial direction, said ball elements fitting closely in said passages and being unrestricted in their movement therein out through ends of the passages;

a second ring rotating with said second body at a location adjacent to said first ring;

a plurality of pockets in said second ring at locations to receive said ball elements; and a spring rotating with said second body and acting to urge said ball elements in an axial direction toward said second ring to thereby urge said ball elements into said pockets to seated positions therein, said ball elements effecting torque transmission between said first and second bodies in the seated positions and unseating from said pockets when the applied torque exceeds a predetermined overload level sufficient to overcome the force of said spring.

2. Apparatus as set forth in claim 1, including means for selectively adjusting the force applied by said spring.

3. Apparatus as set forth in claim 1, including means for stopping driven rotation of one of said bodies when said ball elements are unseated from said pockets.

4. Apparatus as set forth in claim 1, wherein said ball elements are all equidistant from said axis and said ball elements and pockets are arranged in a pattern in which all of the ball elements can seat in the pockets at only one rotative position of said first ring relative to said second ring.

5. Apparatus as set forth in claim 4, wherein:

said ball elements are arranged in plural pairs each including two spaced apart ball elements having midpoints between them at angular locations spaced approximately equidistantly around said first ring;

said pockets are arranged in plural pairs which align with matching pairs of said ball elements in said one rotative position; and said ball elements are spaced apart a different angular distance in each pair thereof.

6. Apparatus as set forth in claim 5, wherein the ball elements in said pairs are angularly spaced progressively farther apart from pair to pair around said first ring.

7. Apparatus as set forth in claim 6, wherein each pair of ball elements includes a leading ball element and a trailing ball element and angular spacing between the leading ball element of each pair and the trailing ball element of an adjacent pair increases progressively around said first ring.

8. Apparatus as set forth in claim 6, wherein each pocket spans a selected angle on said second ring and the angular spacing between the ball elements in each pair exceeds the angular spacing between the ball elements in the next pair by an amount greater than said selected angle.

9. Apparatus as set forth in claim 5, wherein each pocket spans a selected angle on said second ring and the angular distance between the ball elements in each pair exceeds said selected angle.

10. A mechanism for limiting the transmission of torque, said mechanism comprising:

first and second bodies rotating about an axis;

first ring rotating with said first body and having a plurality of passages spaced apart circumferentially in a selected pattern and extending substantially parallel to said axis, each passage being located at substantially the same radial distance from said axis;

a plurality of balls fitting closely in the respective passages and movable therein axially;

a second ring rotating with said second body and presenting a face confronting said first ring, said face presenting a plurality of pockets spaced apart circumferentially thereon in said selected pattern to allow the balls to seat in the pockets when aligned therewith;

a spring acting to urge said balls toward said face to normally seat the balls in the pockets wherein the balls transmit torque between said bodies, said spring yielding to allow the balls to unseat from the pockets when the applied torque exceeds an overload level sufficient to overcome the force of said urging means;

said passages being arranged in three pairs located to position the balls in pairs having midpoints between them situated at equally spaced angles around the first ring:

said pockets being arranged in pairs situated to align with matching pairs of balls; and said balls in each pair being spaced angularly apart differently in each pair so that alignment between the balls and pockets occurs at only one rotative position of said first ring relative to said second ring.

11. Apparatus as set forth in claim 10, wherein the balls in each pair are angularly spaced farther apart progressively from pair to pair around the first ring.

* * * * *